United States Patent [19]
Whitehead

[11] 3,754,345
[45] Aug. 28, 1973

[54] FISHING LINE LURE RETRIEVER

[76] Inventor: Clyde F. Whitehead, Rt. 1, Box 355, Albemarle, N.C.

[22] Filed: Apr. 5, 1972

[21] Appl. No.: 241,219

[52] U.S. Cl. .................................................. 43/17.2
[51] Int. Cl. ............................................. A01k 97/00
[58] Field of Search ........................... 43/17.2, 44.97

[56] References Cited
UNITED STATES PATENTS
1,044,792  11/1912  Levy ..................................... 43/17.2
2,353,357  7/1944  Paulick ................................. 43/17.2
2,453,245  11/1948  McDonald, Jr. ..................... 43/17.2

Primary Examiner—Antonio F. Guida
Assistant Examiner—Gregory E. McNeill
Attorney—Howard I. Podell

[57] ABSTRACT

A weight which is readily attachable to a snagged fishing line for the purpose of releasing the hooked lure of the fishing line. The weight is fastened to its own control line by means of a metal eye and fastens to the fishing line by means of a wire bail which may be locked into the weight, or unlocked to fasten about or to release the fishing line.

3 Claims, 6 Drawing Figures

Patented Aug. 28, 1973  3,754,345
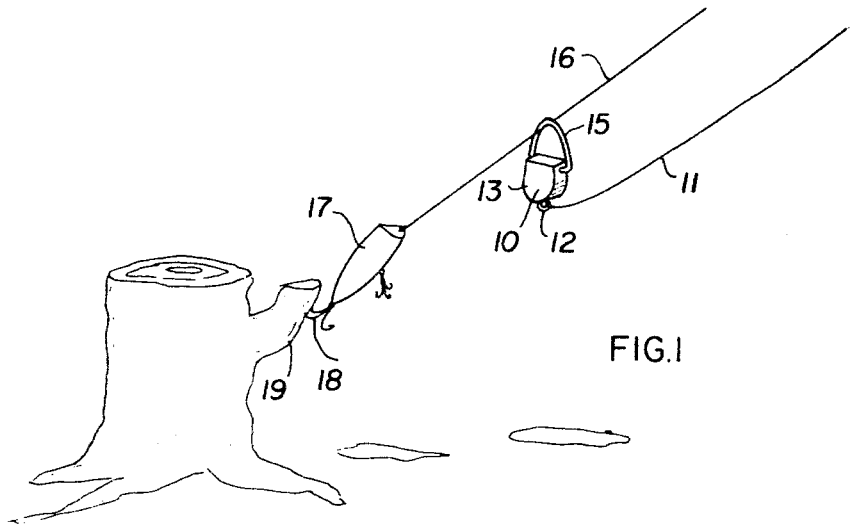
FIG.1
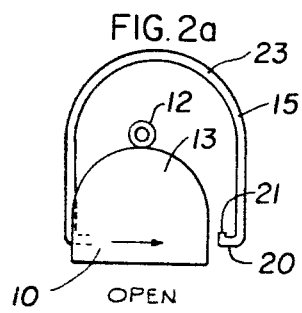
FIG.2a OPEN
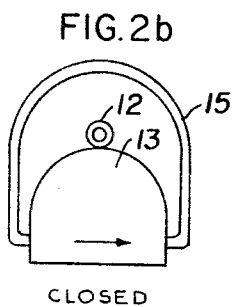
FIG.2b CLOSED
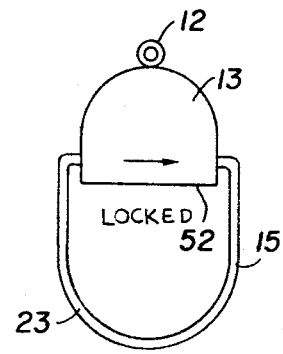
FIG.2c LOCKED
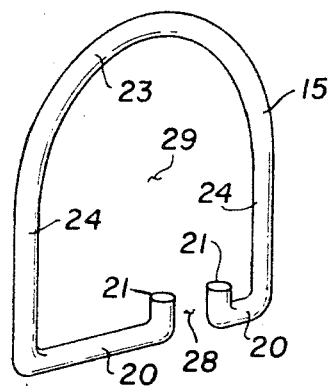
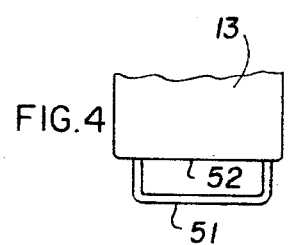
FIG.4
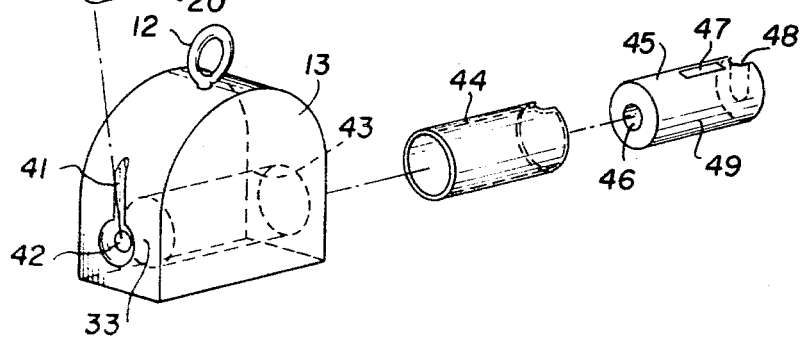
FIG.3

3,754,345

FISHING LINE LURE RETRIEVER

SUMMARY OF THE INVENTION

This invention relates to a device for the retrieving of a snagged fish line lure, and the releasing of said lure from entanglement with underwater debris, weeds, rocks or sunken logs.

The device is readily attached about a fishing line which has been snagged, and is fastened to its own control line.

The device consists of a weighted member which terminates in one end in a metal eye for fastening to its own control line and terminates in the other end in a wire bail which is removable from the weighted member only when said wire bail is folded back over the weighted member. In the released state, the wire bail may be passed over a fishing line for the purpose of fastening the device about the fishing line, or for the purpose of releasing a fastened device from a fishing line.

A feature of the device is that the fastened device cannot inadvertently release from a fishing line when there is any tension on the bail, such tension including the free weight of the weighted member.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of the device fastened about a snagged fishing line;

FIG. 2a is a plan view of the retriever device in the open mode;

FIG. 2b is a plan view of the retriever device in the closed mode;

FIG. 2c is a plan view of the retriever device in the locked mode;

FIG. 3 is an exploded perspective view of the retriever device; and

FIG. 4 is a fragmentary plan view of an additional feature of a wire loop.

DESCRIPTION OF THE PREFERRED EMBODIMENT

Turning now descriptively to the drawing, in which similar reference characters denote similar elements throughout the several views, FIG. 1 illustrates the retriever device 10 which is fastened to its control line 11 by eye 12. The retriever device 10 is fastened loosely about snagged fishing line 16 by means of wire bail 15 which is anchored to the weighted member 13 of the retriever device 10. The retriever device slides loosely down the fishing line 16 until it reaches the general location of the lure 17 which is snagged by its hook 18 to a sunken log 19. The effect of the weight of the retriever device 10 and of jerks of the control line 11 serve to alter the angle of the lure 17 with the log 19 so as to cause hook 18 to release, and permitting retrieval of both fishing line 16 and lure 17.

As shown in FIGS. 2a, 2b, 2c and FIG. 3, the bail 15 is formed of wire in the shape of an open bail or hoop lying in one plane, with a circular section 23 forming an arc of about 180°. The circular section 23 joins, at each end, parallel straight wire sections 24 which each join a straight section 20 of wire. Each section 20 is perpendicular to the straight section 24, with both straight sections 20 leading towards each other, and each ending short of the other in a terminal hook section 21 bent perpendicular to straight section 20 which leads towards the circular section 23. The open space 28 between the terminal hook sections 21 of the bail 15 is wide enough to permit a fishing line 16 to pass into or out of the open center area 29 of bail 15. Preferably the open space 28 between the terminal hook sections 21 is located away from the mid-point between straight sections 24 of the bail. The weighted member 13 which fastens to the bail 15 is of such size as will permit the weighted member 13 to rotate freely within the open area 29 enclosed by the bail 15.

Weighted member 13 is fabricated with a transverse hole 43 into which fits tubing section 44. Tubing section 44 is of a size to fit over shaped cylinder 49 which is permanently fastened to one end section 20 of the bail 15. The transverse hole 43 in the weighted member is reduced in diameter at one side 33 of the weighted section 13 to the diameter of the wire forming the bail 15 so that neither tubing 44 nor cylinder 49 may escape from the transverse hole 43 through side 33 of the weighted member 13. A slot 41 is formed in the external face of side 33 of the weighted member to mate with section 24 of the bail, so as to permit the bail 15 to be pressed close to one side 33 of the weighted member 13 and to permit the open section 28 between the terminal sections 21 of the bail to be pushed into the open position shown in FIG. 2a for the purpose of releasing or fastening the fishing line 16 to the retriever device 10. It is to be noted that since slot 41 in the face of the side 33 of the weighted member 13 only extends from hole 42 towards the eye 12 of the weighted member, the bail 15 must be rotated to lie over the eye as shown in FIG. 2a to permit the bail 15 to be slid in the open position. With the bail 15 rotated away from the eye 12 of the weighted member, as shown in FIG. 2c, and when tension exists between the bail 15 and the eye 12, it is not possible for the bail 15 to be slid with relation to the weighted member so as to clear space 28 between the terminal sections 21 of the bail from the body of the weighted member 13, thus effective locking the bail position.

The long straight section 20 and adjacent terminal hook section 21 of the bail 15 are permanently fastened through hole 46 of the cylinder 49 with terminal section 21 riding in slot 47 of the cylinder. Tubing 44 is fastened over the cylinder 49 to form an integral unit of cylinder 49 and tubing 44, which permits rotation and sliding of the bail 15 to the open, closed or locked position, but does not permit release of the bail 15 completely from the weighted member 13. It is to be noted that the cylinder 49 is relieved at the open end to form a slot 48 to permit the terminal end 21 of the other short end section 20 of the bail to slide with relation to the cylinder 49.

As an additional feature, a fixed rectangular loop 51 may be fastened to the weighted member 13 of the device on an external face 52 opposite the eye 12. This loop 51 serves on occasion to assist in the freeing of an entrapped hook 18 and the release of the fishing lure 17 by catching directly onto a hook 18 of the snagged fishing line 16.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. A retriever device for fastening over a fishing line when a fish hook of the fishing line is snagged to an item of underwater debris, said retriever device comprising a weight which is fastened at one end by a fastening eye to its own retriever control line, and is adaptable to fastening about the fishing line by means of a wire bale attached to the other end of the said weight, said wire bale being fastened to the said weight, with means to open one section of the wire bale for the purpose of passing the bale about a fishing line, said means permitting the wire bale to be thus opened only when there is no tension between the wire bale, and the fastening eye of the weight.

2. The combination as described in claim 1 in which the wire bale is fastened to the weight by means which permit the wire bale to rotate about the weight to which it is fastened, with tension force between the wire bale and the fastening eye of the weight acting to rotate the wire bale away from the weight into the locked position which prevents the bale from sliding to the open position of the wire bale.

3. The combination recited in claim 2 in which the wire bale is formed of a section of inflexible wire which is bent in one plane, terminating in ends which are bent at right angles to their respective adjoining sections of wire, and cylindrical means to fasten to both ends of the wire bale so as to lock the wire bale in a hole in the weight.

* * * * *